March 21, 1933.    J. SISHC    1,902,383
TRACTOR OPERATED BEET LOADER
Filed March 21, 1931    6 Sheets-Sheet 3

March 21, 1933.                J. SISHC                1,902,383
TRACTOR OPERATED BEET LOADER
Filed March 21, 1931            6 Sheets-Sheet 5
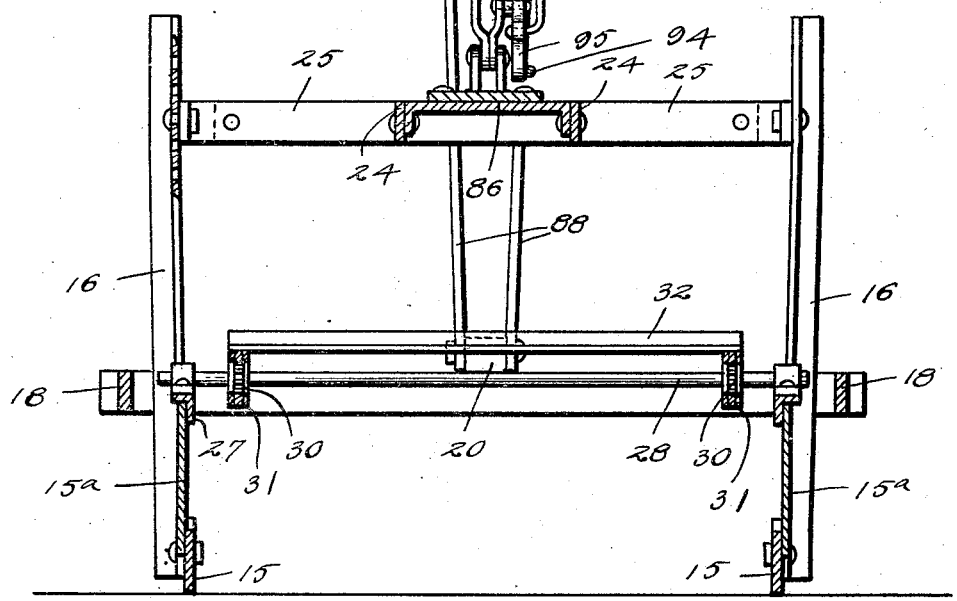
Fig. 5.
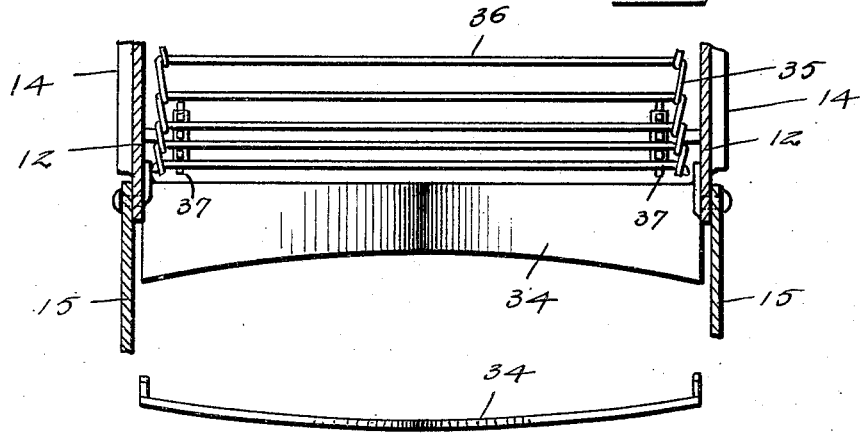
Fig. 6.
Fig. 9.
Inventor
J. Sishc
By Watson E. Coleman
Attorney March 21, 1933. J. SISHC 1,902,383
TRACTOR OPERATED BEET LOADER
Filed March 21, 1931 6 Sheets-Sheet 6
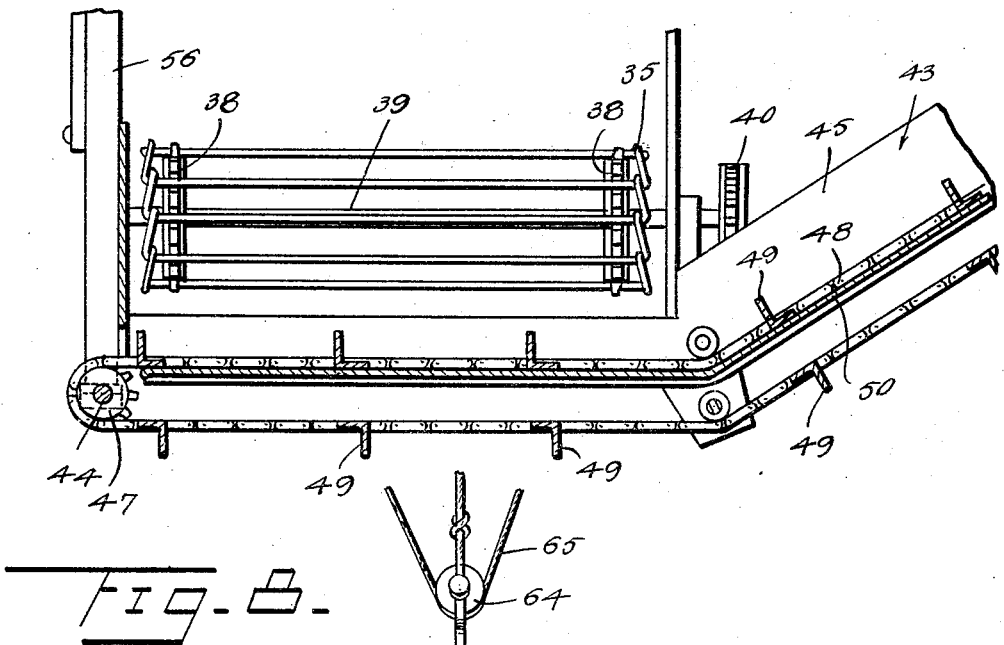
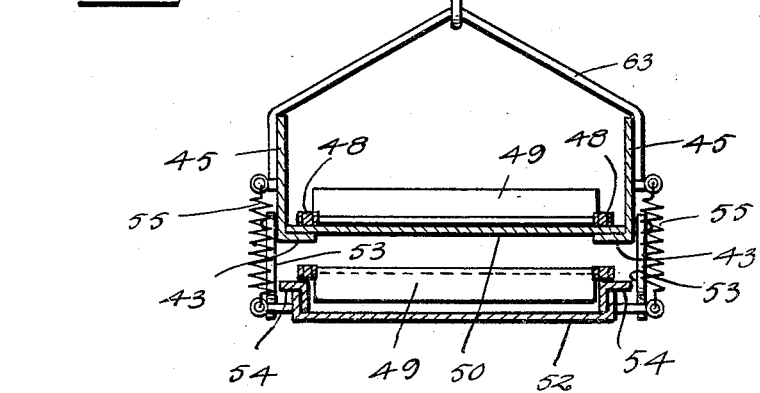
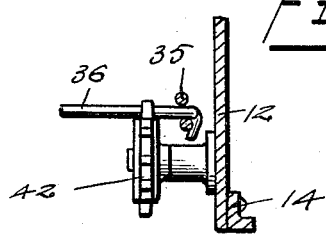
Inventor
J. Sishc
By Watson E. Coleman
Attorney Patented Mar. 21, 1933

1,902,383

UNITED STATES PATENT OFFICE

JULIUS SISHC, OF TORRINGTON, WYOMING

TRACTOR OPERATED BEET LOADER

Application filed March 21, 1931. Serial No. 524,350.

This invention relates to devices for loading beets or like crops in wagons and particularly to mechanism of this kind designed to be drawn by a tractor and operated by power therefrom.

In the Rocky Mountain States, beets are grown under irrigation, the rows being planted twenty inches apart. Ordinarily, when the beets have matured, the beets are lossened by the use of a proper implement and hand laborers then pull the beets and throw them together in a long pile, there being a pile for about every six rows of beets. A ditch is then made between these two piles or rows of beets and then the hand laborers go back to these piles, cut off the tops of the beets with the leaves and toss the beets themselves back into the ditch or depression. Then a wagon is driven along this row of topped beets and the beets are shoveled into the truck or wagon. This takes a considerable amount of man power at a time and furthermore where hand labor is depended on, many beet leaves remain attached to the beets and are loaded into the truck with the beets. The getting rid of these beet leaves and getting the beets clean from leaves and dirt is one of the chief problems of a company manufacturing sugar from these beets.

The general object of the present invention is to provide a structure of the character described which will do away with the hand labor used in loading the beets into wagons or trucks and which will further act to detach the dirt and leaves from the beets so that the beets will be practically clean when they reach the sugar factory.

Still another object is to provide another mechanism of this character which includes a shaking chain conveyor by which the beets are carried upward, which will thoroughly shake the beets without, however, bruising them and thus act to detach the leaves and dirt and in this connection provide an elevator whereby the beets may be carried upward and dropped into the wagon, which is further so constructed that any dirt or leaves remaining attached to the beets may be discharged and still another object in this same connection is to provide an elevator having a slatted bottom over which the beets are carried by an elevator chain, there being a dirt deflecting plate disposed in spaced relation and below this bottom which will act to prevent dirt from being discharged into the wagon or truck and which acts to carry dirt and trash back away from the truck and discharge it on to the ground, and which is further so constructed that if a beet should accidently drop upon this plate, the plate will allow the beet to pass downward and be discharged on to the ground, the beet thus not obstructing the free passage of dirt, leaves or trash downward over the surface of this plate.

A further object in this connection is to provide means which will prevent the truck body from coming in contact with the lower flight of the endless conveyor which carries the beets upward and thus prevent this wagon or truck body from being torn or injured by the plates of the conveyor.

A still further object is to provide means whereby this beet loader may be detachably connected with a tractor and provide for raising or lowering the forward end of the loader and provide means whereby the power taken from the power take-off on the tractor may be transmitted to the different instrumentalities of the loader.

Another object is to provide an endless elevator inclined downward toward the ground and provide a blade at the lower end of this elevator adapted to be slipped beneath the beets so that, as the machine moves forward, the beets may be lifted on to the endless elevator and provide means whereby the beets shall be positively forced upward on this blade and on to the endless elevator.

Other objects will appear in the course of the following description.

My invention is illustrated in the accompanying drawings, wherein:—

Figure 5 is a section on the line 5—5 of Figure 1;

Figure 6 is a section on the line 6—6 of Figure 4;

Figure 7 is a section on the line 7—7 of Figure 2;

Figure 8 is a section on the line 8—8 of Figure 3;

Figure 9 is a front elevation of the lifting blade;

Figure 10 is a fragmentary section through one side wall of the conveyor trough showing in elevation one of the agitating sprockets;

Figure 11 is a detailed cross-section on the line 11—11 of Figure 2;

Figure 12 is a fragmentary detailed section of the segment holding bolt and its casing.

Figure 1:
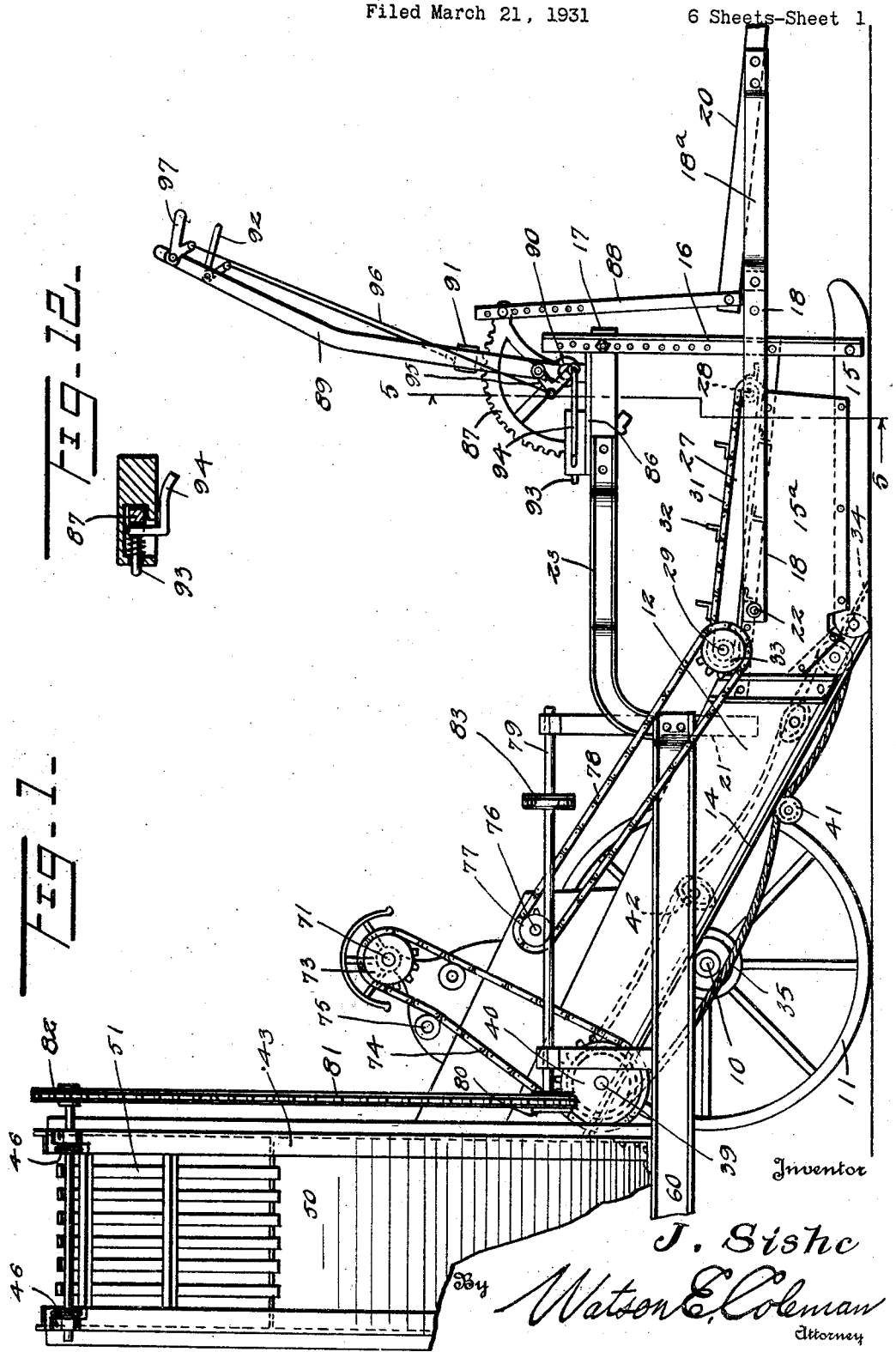
Figure 1 is a side elevation of a beet loader constructed in accordance with my invention.

Referring to these drawings, 10 designates a transversely extending axle carrying the wheels 11. Mounted upon the axle in any suitable manner and forming part of the frame of the machine is a downwardly and forwardly extending trough 12. The wheel frame is designed to be drawn by a tractor. The tractor is not shown, but may be of any suitable character and is preferably one provided with endless chains as tractor elements and having a power take-off shaft. Extending downward and forward from the axle and attached to the bottom of the trough and forming part of the same are angle irons 14 connected to the main frame in any suitable manner and pivotally connected to the sides of the trough are the steel runners 15, whose edges are upwardly inclined at the forward ends. These steel runners are connected to sheet iron webs 15a which form lateral continuations of the side walls of the trough. These steel runners, as illustrated, are connected to vertical angle irons 16 apertured at a plurality of points so that the runners may be adjusted as will be later stated. These angle irons are adjustably connected to angular irons 25 in turn connected to a cross bar 17.

Figure 2:
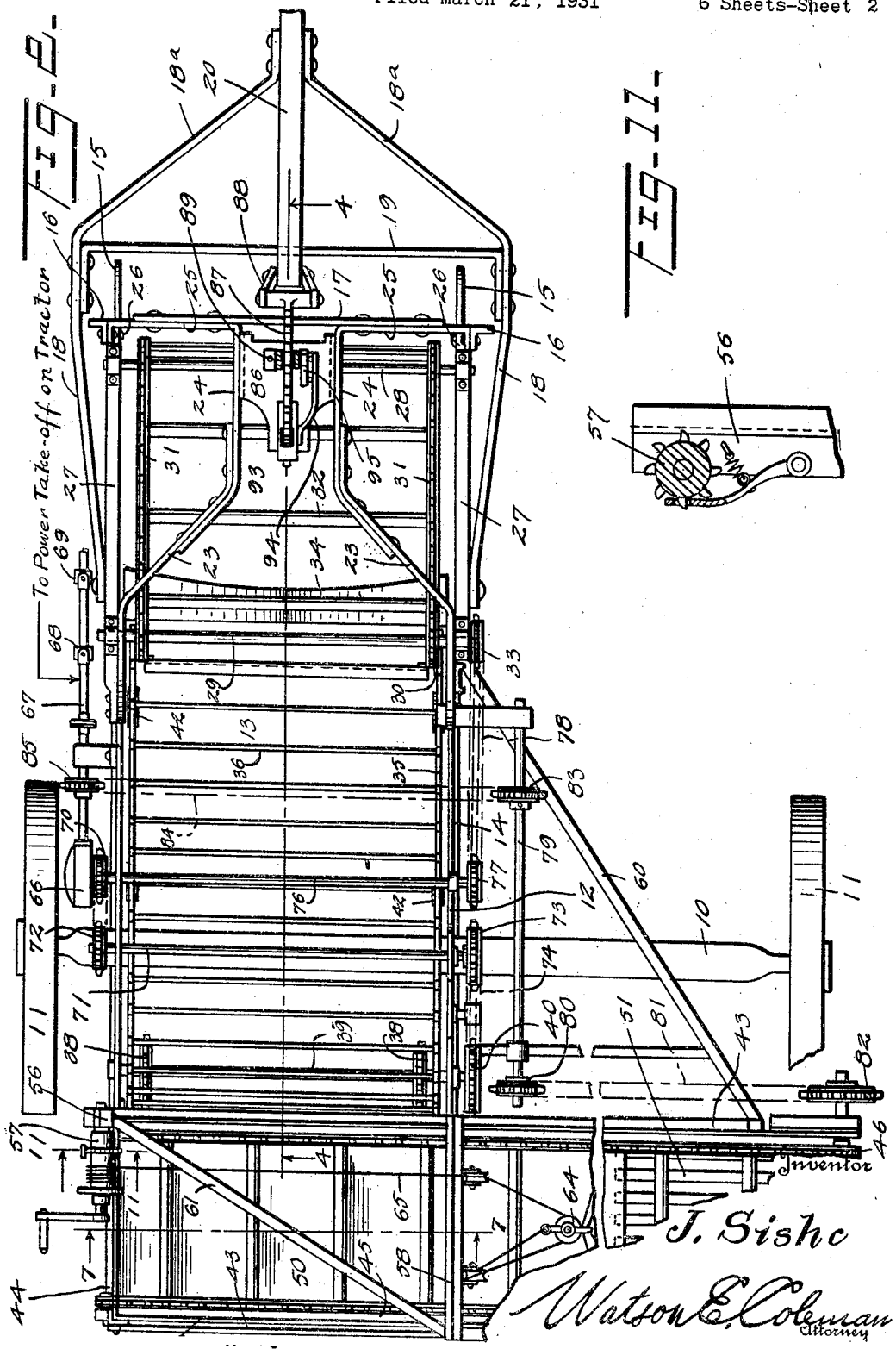
Figure 2 is a top plan view of the structure shown in Figure 1.

Pivoted to the sides of the trough 12 above the rear ends of the runners 15 are the longitudinally extending irons 18 connected by a transverse bar 19 disposed in front of and normally above the runners. These bars 18 are connected by angular portions 18a to the draw bar 20 of the tractor. These members 18 are pivotally connected to the webs 15a as at 22. The vertical members 21 to which the walls of the trough 12 are attached extend upward and forward as at 23 and also convergently with relation to each other as shown in Figure 2.

At the forward ends, these members 23 are attached to irons which extend forward and parallel to each other and have riveted or bolted thereto the extension irons 24 which then extend laterally outward as at 25. Supported at their rear ends upon the vertical portions of the members 21 and at their forward ends upon a vertical iron 26 attached to the laterally projecting portions 25 are the upwardly and rearwardly extending conveyor supporting beams 27. These support at their forward ends the bearings for the transverse shaft 28 and at their rear ends support bearings for a transverse shaft 29. Mounted upon these shafts are sprocket wheels 30 over which sprocket chains 31 pass, these sprocket chains carrying the transverse angular blades 32. The shaft 29 carries upon it at one end the sprocket wheel 33 whereby the shaft may be driven by means to be later described.

Disposed between the rear ends of the runners 15 is a pick up knife or blade 34 having a relatively sharp edge which is coincident with the lower edges of the runners 15, this edge being slightly curved inward toward the back of the knife as shown in Figure 6.

Figure 4:
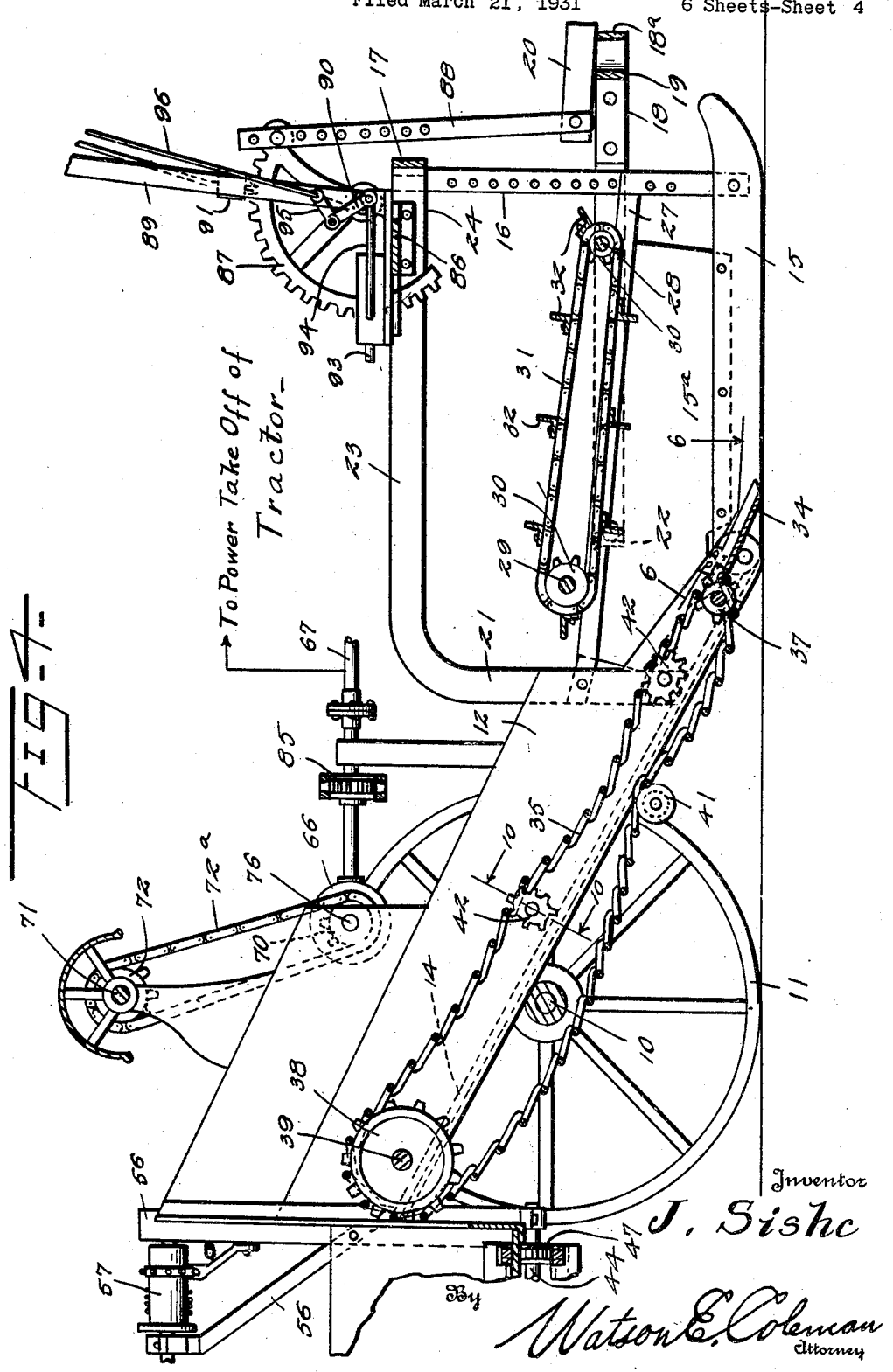
Figure 4 is a section on the line 4—4 of Figure 2.

Disposed rearward of this blade 34 is an endless conveyor formed of two laterally disposed chains 35 and transverse rods 36. The endless elevator is so formed that it passes over a lower pair of sprocket wheels 37 and the upper flight of this elevator passes around a pair of sprocket wheels 38 mounted upon a transverse shaft 39 carrying upon it the driving sprocket wheel 40. This chain is relatively loose as best shown in Figure 4 and the lower flight of the chain passes over one or more guide rollers 41. Intermediate the upper and lower ends of the conveyor there are disposed eccentric sprocket wheels 42 which are engaged by and driven from the chains of the elevator, these sprocket wheels being elongated in one direction or elliptical in form so that as they are rotated through the action of the elevator chains, they will shake the upper flight of the chain without in any way touching or affecting the lower flight of the chain.

Preferably there are two pairs of these eccentric sprocket wheels, one pair being disposed with its major axis at right angles to the major axis of the other pair. Thus it will be seen that when the beets are engaged by and pass up with the endless elevator formed of the parts 35 and 36, the beets will be thoroughly shaken to detach leaves and dirt therefrom and the leaves and dirt will drop through the bars of the elevator and fall upon the ground.

Disposed rearward of this agitating elevator is a second elevator which is disposed at right angles to the agitating elevator.

Figure 3:
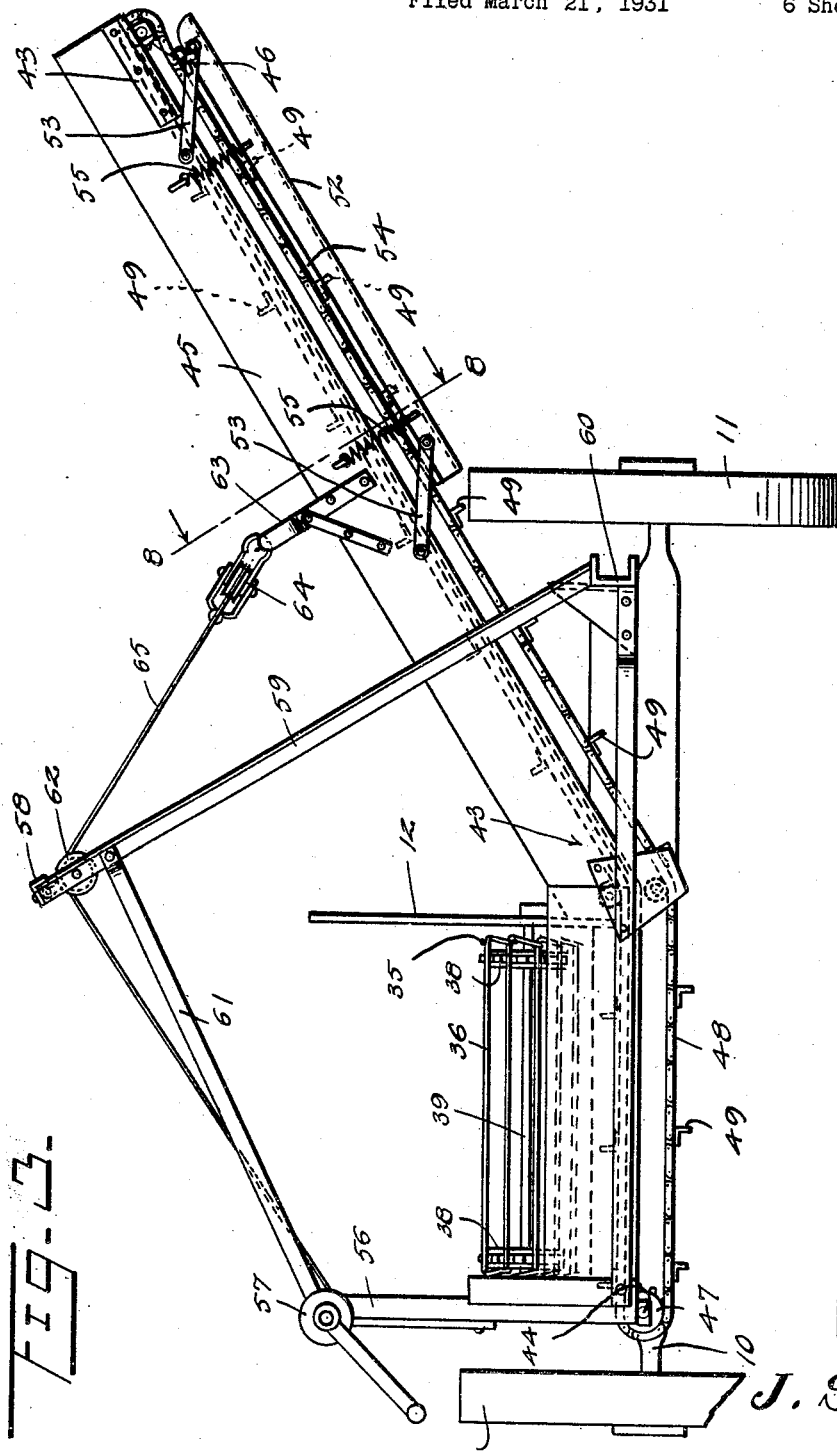
Figure 3 is a rear end elevation of the machine.

This elevator includes a trough 43 which extends horizontally for a distance and then extends upwardly and laterally as shown in Figure 3. The rear end of this elevator trough is pivoted at 44 to the frame of the machine so that the elevator trough may be raised or lowered. This trough has the lateral walls 45 connected thereto in any suitable manner. Passing over upper and lower rollers 46 and 47 mounted upon this trough 43 are the two endless sprocket chains 48 carrying the transversely extending angular blades 49. These blades travel over a sheet steel floor 50, the lower flight of the elevator passing, of course, beneath this floor. The floor 50 does not extend upward the full height of a supporting frame but the upper portion of the floor of the supporting frame is formed by longitudinally extending spaced slats 51 as shown in Figure 1.

Disposed below the upper half of the upwardly extending portion of the elevator is a sheet steel deflecting plate 52 supported in position by the pivoted links 53 disposed at the upper and lower ends of this plate and connected to the lateral angle irons 54 of the plate. Coiled contractile springs 55 are connected to the side boards 45 at the upper and lower ends of this plate and are connected to these angle irons of the deflecting plate 52, thus supporting this plate in a raised position, but spaced from the lower flight of the elevator. Thus any dirt or trash which is carried up with the beets by the elevator drops out through the openings between the slats and discharges on to this plate and is carried downward by this plate and discharged on to the ground, the plate preventing this dirt from being discharged into the beet truck or wagon. If, however, a beet should accidently pass through between the slats or should drop off the upper end of the elevator and on to this plate 52, the weight of the beet will cause it to force the plate 52 downward so as to allow the beet to roll down the plate and on to the ground, after which the springs pull the plate back into position again. Thus there is no chance of this space between this trash deflecting plate and the lower flight of the elevator becoming clogged with beets or other foreign matter falling on to the plate and being unable to pass downward. Furthermore, this plate acts as a guard for the lower flight of the elevator, preventing this lower flight with its blades from coming in contact with the sides of the wagon or truck body and tearing or breaking away the sides of the truck body.

The elevator supporting frame consisting of the members 43 and the side boards 45 is capable of being raised or lowered upon its pivotal center 44 by manually adjustable means as follows:—Mounted at the lower end of the elevator and upon the main supporting frame for the machine are the uprights 56 which support a reel or drum 57 and pawl means whereby it may be held in any rotated position.

Extending above the elevator is a cross bar 58 supported by two legs 59 which extend down to and are operatively connected to the rear end of a diagonal bracing beam 60 and braced or supported in any suitable manner. From one of the supporting bars 56 extend the divergent bracing bars which are also engaged with the legs 69. This cross bar 58 supports two pulleys 62. Supporting the elevator frame is a U-shaped yoke 63 carrying the pulley 64. The cable 65 is wound upon the drum 57, passes upward over a pulley 62, then around pulley 64, then over the other pulley 62 and back to the frame of the pulley 64. Thus it is obvious that when the reel is turned to wind up the cable 65, the elevator will be lifted and when it is released, the elevator will be lowered.

Means whereby the various parts heretofore described are driven as follows:—

Mounted upon one side of the main frame of the machine is a gear case designated 66. Into this gear case extends the power driven shaft 67. This is connected through universal joints 68 and 69 to the power take-off shaft of the tractor. Mounted upon a shaft 76 entering the gear case and driven from the shaft 67 is the sprocket wheel 70. Disposed above, but slightly forward of the sprocket wheel 70 is a transversely extending shaft 71 carrying upon it a sprocket wheel 72 which is driven from the sprocket wheel 70 by a chain 72a and at its other end carrying upon it a sprocket wheel 73, over which passes a sprocket chain 74.

This sprocket chain guided by the idler wheels 75 is carried down and around the sprocket wheel 40 on shaft 39 and thus drives the elevating and agitating chains 35—36. Supporting the sprocket wheel 70 and driven from shaft 67 is the shaft 76 which carries a sprocket wheel 77 from which a sprocket chain 78 extends to and over the sprocket wheel 30 or shaft 29 and thus the conveyor 31 is driven.

For the purpose of driving the elevator chains 48, I provide a shaft 79 mounted in suitable bearings on the main frame and extending parallel to the path of movement of the elevator 36. This carries upon it at one end a sprocket wheel 80 which is connected by a chain 81 to a sprocket wheel 82 mounted upon the shaft supporting the sprocket wheels 46. The other end of the shaft 79 carries upon it the sprocket wheel 83 which is driven by a sprocket chain 84 from the sprocket wheel 85, mounted upon the shaft 67.

For the purpose of raising or depressing the forward ends of the runners 15, I mount upon the beams 23 the plate 86 which constitutes a support for a quadrant 87. This quadrant is pivoted upon the plate and at its forward end carries the downwardly extending rods 88 which are pivoted to the rear end of the tongue 20. Therefore, when this quadrant 87 is forced forward, it will act to raise the frame consisting of the parts 21, 23 and the runners and blade 34. When the quadrant is drawn backward, it will act to permit these parts to be lowered. For the purpose of shifting the quadrant, I provide the lever 89 which is pivoted at 90 and has a detent 91 engaging the teeth of the quadrant, this detent being shiftable out of engagement with the teeth by means of the hand grip 92 mounted upon the upper end of the lever.

For the purpose of holding the quadrant in any suitable position, I provide the latch 93, spring actuated and projected into the teeth of the quadrant, this latch being connected by a link 94 to a lever 95 in turn connected by a rod 96 to a hand grip 97 mounted upon the upper end of the lever. When this hand grip 97 is actuated, it will retract the latch 93 and the lever may then be swung to shift the quadrant as before described.

The general operation of this mechanism will be obvious from what has gone before. The tractor draws the loader along the line of beets and the blade 34 is pushed beneath the beets and the blades 32 of the conveyor 31 push the beets upward on to the agitating conveyor 36.

Here the beets are shaken and agitated by means of the cams or eccentrics 42 and the dirt, leaves and adhering trash loosened and separated from the beets. The beets are then discharged on to the conveyor 48 and carried upward by this conveyor and when the beets reach the slatted portion of the conveyor floor, any remaining trash will drop out and on to the plate 52 while the cleaned beets are discharged into the beet truck. This mechanism has been thoroughly tried out and has been found to be particularly effective. The beets are not bruised or otherwise injured and they are thoroughly cleaned of trash before being discharged into the beet truck, thus raising the value of the beets to the sugar factories. The mechanism is relatively simple and can be easily controlled.

While I have designed this mechanism, particularly for the purpose of loading beets, I wish it understood that it might be used for loading other vegetables such as potatoes and the like.

I claim: —

1. A beet loader including a wheel supported frame, a horizontally disposed pick-up blade carried by the frame, an agitating conveyor extending upward and rearward from the pick-up blade, means disposed above the pick-up blade and extending forward and rearward thereof whereby the beets in the path of movement of the blade are carried upward on to the blade and on to the conveyor, a transversely extending endless elevator on which the beets ar discharged from the conveyor and including a floor having a slatted upper portion, and a plate disposed below and in spaced relation to the slatted portion of the floor and extending downward and inward to carry trash discharged through said slatted portion downward and inward.

2. A beet loader including a wheel supported frame, a horizontally disposed pick-up blade carried by the frame, an agitating conveyor extending upward and rearward from the pick-up blade, means disposed above the pick-up blade and extending forward and rearward thereof whereby the beets in the path of movement of the blade are carried upward on to the blade and on to the conveyor, a transversely extending endless elevator on which the beets are discharged from the conveyor and including a floor having a slatted upper portion, and a plate disposed below and in spaced relation to the slatted portion of the floor and extending downward and inward to carry trash discharged through said slatted portion downward and inward, said plate being resiliently supported from the frame of the elevator to thereby permit it to shift downward when a relatively heavy object is deposited on the plate.

3. A beet loader including a wheel supported frame, a horizontally disposed pick-up blade carried by the frame, an agitating conveyor extending upward and rearward from the pick-up blade, means disposed above the pick-up blade and extending forward and rearward thereof whereby the beets in the path of movement of the blade are carried upward on to the blade and on to the conveyor, a transversely extending endless elevator on which the beets are discharged from the conveyor and including a floor having a slatted upper portion, and a plate disposed below and in spaced relation to the slatted portion of the floor and extending downward and inward to carry trash discharged through said slatted portion downward and inward, links supporting said plate from the frame of the elevator and permitting the plate to swing downward and inward, and springs engaged with the frame of the elevator and said plate and resiliently urging the plate upward but permitting it to swing downward under a relatively heavy weight.

4. A loader of the character described, including a wheeled supporting frame, an elevator mounted upon but extending transversely of the frame, and comprising an endless element having blades, a floor over which the upper flight of said endless element passes, and a plate yieldingly supported upon the frame of the elevator and disposed below the lower flight of said endless element and acting to protect the lower flight of the endless element from contact with a wagon body.

5. A beet loader including a wheel supported axle, a frame mounted thereon including a conveyor trough extending downward and forward and tiltable around the axis of the axle, runners carried on the lower end of the trough, a blade disposed at the lower end of the trough, an agitating conveyor disposed with its upper flight operative over the trough, an elevator upon which the conveyor discharges, draft bars pivotally connected to the frame and extending forward therefrom and then inward toward each other and adapted to be pivotally connected to the draw bar of the tractor, and means for raising or lowering the forward end of the frame including a sector pivotally mounted upon the forward end of the frame, a vertical member adjustably connected to the forward end of the sector and at its lower end operatively bearing against the draw bar of a tractor, a handle lever for operating the sector, and means for locking the sector in any adjusted position.

6. A beet loader including a wheel supported axle, a frame mounted thereon including a conveyor trough extending downward and forward and tiltable around the axis of the axle, runners carried on the lower end of the trough, a blade disposed at the lower end of the trough, an agitating conveyor disposed with its upper flight operating over the trough, an elevator upon which the conveyor discharges, draft bars pivotally connected to the frame and extending forward therefrom and then inward toward each other and adapted to be pivotally connected to the draw bar of the tractor, and means for raising and lowering the forward end of the frame including a sector pivotally mounted upon the forward end of the frame, a handle lever pivoted upon the same pivot as the sector and operating thereover, manually operable means for latching the handle lever at any desired point on the sector, a latch for holding the sector latched in adjusted position, and means on the handle lever for releasing said latch to permit the sector to be operated, and a vertical member adjustably connected to the forward end of the sector and extending downward therefrom and operatively bearing against the draw bar of the tractor.

7. A beet loader including a wheel supported axle, a frame mounted upon the axle for oscillation around the axis of the axle, a downwardly and forwardly extending conveyor trough operatively supported upon the frame, runners pivotally connected to the forward end of the trough, means on the frame whereby said runners may be vertically adjusted with reference to the trough and frame, a transversely extending pick-up knife disposed at the lower end of the trough an agitating conveyor having its upper flight operating over the trough, an elevator upon which the conveyor discharges, means disposed above the transversely extending blade acting to positively engage beets raised by said pick-up blade and carrying said beets rearward on to the agitating conveyor, means for driving the conveyor, the beet lifting means and the elevator, draft bars pivotally connected to the frame of the machine and extending forward and then inward and adapted to be operatively connected to the draft bar of a tractor, and means for raising or lowering the forward end of the frame with the runners and conveyor trough, said means being adapted to be operatively connected to the rear end of the tractor draw bar.

8. A beet loader including a wheel supported axle, a frame mounted thereon and tiltable around the axis of the axle, a conveyor trough carried by the frame and extending downward and forward, runners mounted upon the forward end of the trough and extending forward therefrom, means for angularly adjusting the runners with reference to the trough in vertical planes, a pick-up blade mounted at the lower end of the trough, an agitating conveyor having its upper flight disposed to operate over the bottom of said trough and including sprocket chains, and sprocket wheels supporting said chains, an endless conveyor having its rear end disposed above the forward end of the agitating conveyor and adapted to shift the beets rearward on to said endless conveyor, sprocket wheels supporting the last named endless conveyor, an elevator upon which the agitating conveyor discharges, means for operating the agitating conveyor, the endless conveyor and the elevator including a driving shaft mounted upon the frame and adapted to be connected to the power take-off of the tractor, draw bars pivotally connected to the frame and extending forward therefrom and adapted at their forward ends to be connected to the draw bar of a tractor, and manually operable means mounted upon the forward end of the frame and engageable with the draw bars of the tractor whereby the forward end of the frame may be raised or lowered.

In testimony whereof I hereunto affix my signature.

JULIUS SISHC.